United States Patent
Neeb et al.

(10) Patent No.: US 10,549,545 B2
(45) Date of Patent: Feb. 4, 2020

(54) METHOD FOR DETECTING AND COMPENSATING FOR DEFECTIVE PRINTING NOZZLES IN AN INKJET PRINTING MACHINE USING A THRESHOLD CALCULATION BASED ON WEIGHTING FACTORS

(71) Applicant: HEIDELBERGER DRUCKMASCHINEN AG, Heidelberg (DE)

(72) Inventors: Steffen Neeb, Bensheim (DE); Nicklas Raymond Norrick, Heddesheim (DE); Andreas Henn, Neckargemuend (DE); Andreas Fehlner, Mannheim (DE); Thomas Wolf, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/360,692

(22) Filed: Mar. 21, 2019

(65) Prior Publication Data
US 2019/0291461 A1 Sep. 26, 2019

(30) Foreign Application Priority Data
Mar. 21, 2018 (DE) .................. 10 2018 204 312

(51) Int. Cl.
*B41J 29/393* (2006.01)
*B41J 2/21* (2006.01)
*G06K 15/10* (2006.01)

(52) U.S. Cl.
CPC .......... *B41J 2/2139* (2013.01); *B41J 2/2142* (2013.01); *B41J 2/2146* (2013.01); *B41J 29/393* (2013.01);
(Continued)

(58) Field of Classification Search
USPC ........................................... 347/19
See application file for complete search history.

(56) References Cited

U.S. PATENT DOCUMENTS

| | | | | |
|---|---|---|---|---|
| 6,347,856 B1 * | 2/2002 | Arquilevich | ........... | B41J 2/2135 347/19 |
| 6,623,096 B1 * | 9/2003 | Castano | ................. | B41J 2/2135 347/19 |

(Continued)

FOREIGN PATENT DOCUMENTS

| | | |
|---|---|---|
| DE | 60206123 T2 | 6/2006 |
| DE | 60302188 T2 | 7/2006 |

(Continued)

*Primary Examiner* — Lam S Nguyen
(74) *Attorney, Agent, or Firm* — Laurence A. Greenberg; Werner H. Stemer; Ralph E. Locher

(57) ABSTRACT

A method for detecting and compensating defective printing nozzles in an inkjet printing machine includes periodically printing at least one printing nozzle test chart having horizontal rows of equidistant vertical lines underneath one another, with only nozzles contributing to the test chart in every row corresponding to horizontal rows, and printing an area coverage element geometrically associated with the test chart. Both elements are recorded by an image sensor and evaluated by a computer. The computer identifies print defects by evaluating the area coverage element and allocates the defects to defective nozzles. The computer evaluates the test chart based on thresholds to detect defective nozzles and compensate detected defective nozzles. The computer compares the detected defective nozzles from the area coverage element and the test chart to identify detected defective nozzles causing defects in only one element and calculates the thresholds based thereon to minimize the detected defective nozzles.

8 Claims, 5 Drawing Sheets

(52) U.S. Cl.
CPC ..... *G06K 15/102* (2013.01); *B41J 2029/3935* (2013.01)

(56) References Cited

U.S. PATENT DOCUMENTS

| | | | |
|---|---|---|---|
| 6,953,238 | B2 | 10/2005 | Koitabashi et al. |
| 7,055,925 | B2 * | 6/2006 | Subirada ................. H04N 1/23 347/19 |
| 7,201,462 | B2 | 4/2007 | Shibata et al. |
| 8,246,138 | B2 * | 8/2012 | Gaston ................. B41J 2/2142 347/19 |
| 8,646,869 | B2 | 2/2014 | Yamazaki |
| 8,721,033 | B2 * | 5/2014 | Mongeon ............... B41J 29/393 347/19 |

FOREIGN PATENT DOCUMENTS

| | | |
|---|---|---|
| DE | 102016224303 A1 | 6/2018 |
| DE | 102017217993 B3 | 7/2018 |
| EP | 2505364 A2 | 10/2012 |

* cited by examiner

|  | good image / reference | |
|---|---|---|
|  | no | yes |
| jetting angle value (phase) <= jetting angle threshold | OK | β-defect |
| jetting angle value (phase) > jetting angle threshold | α-defect | OK |

"measured result" 18

METHOD FOR DETECTING AND COMPENSATING FOR DEFECTIVE PRINTING NOZZLES IN AN INKJET PRINTING MACHINE USING A THRESHOLD CALCULATION BASED ON WEIGHTING FACTORS

CROSS-REFERENCE TO RELATED APPLICATION

This application claims the priority, under 35 U.S.C. § 119, of German Patent Application DE 10 2018 204 312.4, filed Mar. 21, 2018; the prior application is herewith incorporated by reference in its entirety.

BACKGROUND OF THE INVENTION

Field of the Invention

The invention relates to a method for detecting and compensating for defective printing nozzles in an inkjet printing machine.

The technical field of the invention is the field of digital printing.

It is always a human observer who gives the final verdict on the quality of a printed product, be that the customer who buys the final product, e.g. the one who buys a hair dye in its packing on the shelf of a supermarket, the customer who ordered the printed product, the operator/owner of a print shop that produced the printed product on a printing machine, a product manager, a qualification engineer, an employee responsible for quality control at the assembly department, or a service employee at the company that manufactures the printing machine on which the printed product is produced. The quality and the resultant "sellability" of a printed product will always be subjective verdicts based on the deviation between the subjective expectations or requirements for a print product and the actual tangible counterpart. The actual printed product may be wide off the mark in terms of just those expectations or requirements and it may be categorized in accordance with the following assessments: perfect—good—satisfactory—still acceptable (i.e. may be sold)—unsellable.

Especially in digital printing based on inkjet technology, the quality of a print is determined by the performance or quality of the jetting process of every single printing nozzle. In inkjet printing machines, defective, e.g. failed or missing printing nozzles that do not jet ink, printing nozzles that jet at an undesired angle, printing nozzles that do not jet continuously, and printing nozzles that jet unstably over time, result in deviations between the subjective expectations and requirements for the printed product and the actual print. Those deviations may differ in terms of severity. A missing printing nozzle, for instance, creates a so-called "white line" in the corresponding color, which means that the substrate shines through at the location in question. In most cases, white lines make a printed product unsellable. However, white lines may also be created by nozzles that jet at a very distinct angle. Such white lines likewise make a printed product unsellable. Nozzles that jet at a less distinct angle may not create a white line, but create inhomogeneity, for instance in solid areas. Those printed products often belong to the satisfactory or still sellable categories.

Defective printing nozzles of that type or nozzles that jet at a very distinct angle and are deactivated in accordance with specific rules may be compensated for by causing neighboring printing nozzles to jet larger drops that cover the printing substrate that shines through in the region of the defective printing nozzle, thus effectively compensating for the white line. Such compensation processes avoid white lines and consequently unsellable printed products, but create more inhomogeneity, for instance in solid areas, thus making the products only just acceptable and consequently sellable. The performance of the compensation process thus decides the category in which the printed product will be in terms of its quality.

Those deviations may be measured on the basis of local deviations of the Lab values, e.g. by $\Delta E$ values or alternatively by measuring density deviations. A major problem of a subjective human assessment is that a 100% assessment of all printed products takes a lot of time and is thus hardly ever done in an industrial context. A subjective assessment based on spot checks is an alternative solution. A problem with that alternative is, however, that the quality of the printed products may be subject to high-frequency changes, making it impossible for all unsellable printed products to be detected.

Since, as indicated above, a human assessment of all printed products is hardly possible in an expedient way in an industrial context, the quality of every single printing nozzle is described by specific characteristic values. Those characteristic values include volume, angle, gray value and are obtained in suitable image processing operations from recorded prints of the print job itself or from highly sensitive printed charts that are suitable in terms of the characteristic values. They are repeatedly obtained at specified intervals during an ongoing printing operation, i.e. in line. However, an approach that establishes those characteristic values before every new print job or at specified intervals in time may be sufficient.

European Patent Application EP 2505364 A2, corresponding to U.S. Pat. No. 8,646,869, discloses a method for determining a threshold for a detection of defective printing nozzles. However, that document only discloses how to detect printing nozzles having a printed dot which deviates from the desired location. However, the characteristic values to assess the current condition of the printing nozzles for which the thresholds are determined differ from the characteristic values mentioned above. Moreover, that threshold determination process does not include any subjective assessment of the print defects and thus of the defective printing nozzles that cause the print defects. Instead, the process is strictly based on objective criteria, i.e. on characteristic values.

That corresponds to the most recent known prior art approach, which envisages a classification of the printing nozzles as follows: printing nozzle active or on, printing nozzle inactive or off, to be carried out on the basis of whether the characteristic values exceed the threshold (yes/no). The thresholds are defined on the basis of empiric values. A nozzle is switched on again, i.e. reactivated when a specified number of successive detections/characteristic value determination processes yields characteristic values that are below the threshold. An expedient approach is to use the values of four detection processes with results below the threshold.

However, the prior art does not envisage any comparison between those thresholds and a subjective assessment by a human observer. If at all, such a comparison is done only in a very impromptu way, i.e. it is more or less a gut reaction by the observer.

A disadvantage of that process is that the current approach always uses the same thresholds to activate and deactivate the printing nozzles, i.e. thresholds that have coarsely been set in an empirical way. Therefore, the thresholds do not take into consideration that the behavior of the ink may depend on the properties of the substrate. Nor do they consider that every ink color is composed of different ink designs, which may lead to different manifestations of their features. That means that in some cases, the thresholds are too lax, while they are too strict in others. Thresholds that are too lax result in the creation of waste, whereas thresholds that are too strict cause unnecessary printing nozzle deactivations. In addition, the known process is implemented at low frequency, usually just once every day. Many defects are the result because inkjet printing is a volatile process and printing nozzle quality changes do not get noticed. Quality and/or productivity suffer.

SUMMARY OF THE INVENTION

It is accordingly an object of the invention to provide an efficient method for detecting and compensating for defective printing nozzles in an inkjet printing machine using a threshold calculation based on weighting factors, which overcomes the hereinafore-mentioned disadvantages of the heretofore-known methods of this general type.

With the foregoing and other objects in view there is provided, in accordance with the invention, a method for detecting and compensating for defective printing nozzles in an inkjet printing machine with a computer, wherein at least one multi-row printing nozzle test chart formed of a specified number of horizontal rows of equidistant vertical lines are printed periodically and disposed underneath one another, with only those printing nozzles of the print head of the inkjet printing machine contributing to the printing nozzle test chart in every row that corresponds to the specified number of horizontal rows, and at least one area coverage element is printed, the area coverage element being geometrically associated with the at least one multi-row printing nozzle test chart, both elements are recorded by at least one image sensor and evaluated by the computer, the computer evaluates the recorded area coverage element to find print defects and to allocate the print defects to defective printing nozzles, the computer evaluates the multi-row printing nozzle test chart on the basis of thresholds to detect defective printing nozzles, and the defective printing nozzles that have been detected in this way are then compensated for. According to the method, the computer compares the detected defective printing nozzles from the recorded area coverage element and from the printing nozzle test chart to identify those detected defective printing nozzles that cause defects in only one of the two elements, and, based on these data, calculates the thresholds in such a way that the number of detected defective printing nozzles is minimized.

The core aspect of the method of the invention is to determine the thresholds that decide whether a printing nozzle is defective or not during the evaluation of the multi-row printing nozzle test chart as accurately as possible. A problem that frequently occurs in this context is that there may be printing nozzles that seem to be defective based on their performance in the printing of the printing nozzle test chart, but do not create defects in the actual print to be created. As a consequence, the printing nozzle in question is deactivated and compensated for. Since printing nozzle compensation often causes the quality of the print to be created to deteriorate, such false positives are to be avoided as far as possible. Thus the thresholds need to be adapted in such a way that only printing nozzles that cause defects in the actual print as represented by the area coverage element are actually marked as defective. It goes without saying that the reverse case in which printing nozzles that work correctly based on the applied threshold but cause defects in the area coverage elements likewise need to be avoided. In most cases, such a state is even more problematic than a printing nozzle that is erroneously marked as defective. Based on these aspects, it becomes clear that thresholds that are too low cause too many false positives whereas thresholds that are too high make an accurate detection of defective printing nozzles more difficult. There are, of course, further reasons why defects or deviations may occur in one of the two elements but not in the other and they, too, should be taken into consideration to calculate optimum thresholds. Thus the threshold settings may be calculated in such a way that the occurrence of such defective printing nozzles having an unclear status is minimized and the efficiency of the printing machine is maximized.

Advantageous and thus preferred further developments of the method will become apparent from the associated dependent claims and from the description and associated drawings.

Another preferred development of the method of the invention in this context is that defective printing nozzles detected in the recorded area coverage element but not in the printing nozzle test chart correspond to a beta defect whereas defective printing nozzles detected in the recorded printing nozzle test chart but not in the area coverage element correspond to an alpha defect and the computer assigns factors to these alpha and beta defects to allow these alpha and beta defects to be weighted and the thresholds to be calculated in a weighted way based on the weighting of the alpha and beta defects. As explained above, printing nozzles that cause deviations or defects only in the area coverage element or only in the nozzle test chart stand in the way of an optimum compensation for defective printing nozzles. Printing nozzles that have been found defective based on the printing nozzle test chart but do not cause a defect in the area coverage element (defects that will be referred to as alpha errors herein) have a different effect on print quality than printing nozzles that have been found defective based on the defects they cause in the area coverage element but do not cause any defects in the printing nozzle test chart (defects that will be referred to as beta defects herein). A printing nozzle that creates visible print defects in the print to be created at a later point as represented by the area coverage element but does not have any detectable deviation in the printing nozzle test chart results in a defective printing nozzle that is not compensated for. Such a case is frequently much worse for the operator in terms of attainable print quality than a case in which printing nozzles are switched off and compensated for on the basis of conspicuous deviations in the printing nozzle test chart although no defect in the actual print or in the area coverage element is found. Thus an expedient approach to calculating accurate thresholds is to assign factors to the alpha and beta defects that form part of the calculation and allow alpha and beta errors to be weighted. These factors will naturally have an effect on the resultant calculated thresholds. Accordingly, if the factor for beta defects is much higher than the factor for alpha defects, i.e. if beta defects have much more weight than alpha defects, the resultant thresholds will be lower, i.e. stricter than if both defects have the same weight or if alpha defects have more weight.

A further preferred development of the method of the invention in this context is that the weighted calculation of the thresholds occurs by applying a mathematical function that includes alpha and beta defects with their respective factors and minimizes a total of those values. The use of a mathematical function that contains alpha and beta defects and the corresponding associated weighting factors in a calculation of the threshold in a weighted way is inevitable. The function ought to be suitable for calculating a threshold for which the total of alpha and beta defects including the weighting factors is minimized in a corresponding way.

An added preferred development of the method of the invention in this context is that each one of the thresholds refers to a specific characteristic value of the inkjet printing operation such as the deviation of the print dot of a printing nozzle, the jetted amount of ink, the homogeneity of the resultant color density, the manifestation of the ink features or of the substrate features, or the characteristic values determined by the computer based on the evaluation of the recorded printing nozzle test chart. It goes without saying that the thresholds that are used in the evaluation of the printing nozzle test chart need to refer to corresponding characteristic values that are determined in the evaluation of the printed and recorded printing nozzle test chart. The most important characteristic values include the so-called phase, i.e. the angle at which a printing nozzle jets or the offset of the print dot at which the printing nozzle prints, and the so-called amplitude, i.e. how much ink the printing nozzle in question can jet. Other characteristic values refer to the homogeneity of the color density, the manifestation of the characteristics of the ink or of the substrate, and many more characteristic values that will not be individually listed herein in full. The more of these characteristic values that are determined in the evaluation of the recorded printing nozzle test chart, the greater the accuracy of the decision as to whether a printing nozzle is defective or not. The corresponding thresholds for these characteristic values naturally need to be calculated for every characteristic value and need to be applied in the evaluation of the recorded printing nozzle test chart.

An additional preferred development of the method of the invention in this context is that the mathematical function likewise depends on the characteristic values of the inkjet printing operation. Due to the fact that the thresholds depend on the corresponding characteristic values of the inkjet printing operation that are determined in the evaluation of the recorded printing nozzle test chart, it is only logical that in addition to the parameters of the weighting factors and the variables of the alpha and beta defects, the mathematical function also includes the characteristic values of the inkjet printing operation as function values. This results in a corresponding multidimensional function or rather in a multidimensional system of equations because this concerns different thresholds for multiple characteristic values.

Another preferred development of the method of the invention in this context is that the solution to the mathematical function for calculating the thresholds is implemented by applying a logistic regression, a discriminant analysis, a Bayes classifier, a perceptron, or a neuronal network. The approach to a solution to the multidimensional mathematical function or multidimensional system of equations to be used is not of major importance to the method of the invention. The important aspect is that the mathematical function or system of equations is solved to calculate the corresponding thresholds for the characteristic values based thereon.

An added preferred development of the method of the invention in this context is that the method is carried out to set up the inkjet printing machine and then only the printing nozzle test chart is printed at regular intervals during the production run to be evaluated with the aid of the calculated thresholds; then the detected defective printing nozzles are deactivated and compensated for by suitable compensation processes. It is important to understand that the method of the invention involving a simultaneous evaluation of an area coverage element and of a printing nozzle test chart is preferably used to set up the inkjet printing machine. Once the thresholds have been accurately determined and set, it is sufficient in the production run on the printing machine to print the printing nozzle test chart and to evaluate it on the basis of the thresholds that have been calculated in accordance with the invention at regular intervals to see how the states of the printing nozzles change and whether there are newly defective printing nozzles that need to be switched off and compensated for. The reverse development, namely that printing nozzles that have been declared defective are "revived" and may again be used in the printing operation is likewise possible and therefore needs to be monitored. Thus when the printing nozzle test chart is printed, a preferred aspect is that all printing nozzles, even the ones that have actually been switched off and declared defective, contribute to the print. The switching off and compensation for these defective printing nozzles only concerns the printing of the actual print to be created.

A concomitant preferred development of the method of the invention in this context is that the suitable compensation processes include a compensation by printing nozzles that are adjacent the detected defective printing nozzle; the compensation is attained by increasing the amount of ink jetted by the adjacent printing nozzles once a printed image has been screened or by adapting the gray values prior to the screening of a print. The defective printing nozzles that have been detected by the method of the invention of course need to be switched off and compensated for. Various methods are possible for the compensation. In principle, all known compensation methods may be used in the context of the method of the invention. The most common approach is, however, to use the immediately neighboring printing nozzles to compensate for a defective printing nozzle. There are a number of options in the context of this approach; for instance, when a defective printing nozzle is discovered during a production run, the printing nozzle in question may simply be switched off and, still during the ongoing production run, the neighboring printing nozzles may be actuated to jet an increased amount of ink to allow ink to flow into the white line caused by the defective printing nozzle. When a defective printing nozzle is discovered, another possibility is to adapt the image to be printed prior to the screening process in such a way as to increase the gray values immediately adjacent the gray values that are located in the region of the expected white line to compensate for the white line that will be created in the print after the screening process in the actual production run. Of course, a disadvantage of this approach is that the print needs to be rescreened, a measure that is not required in the first approach of compensation with a direct actuation of the adjacent printing nozzle after the screening process.

Other features which are considered as characteristic for the invention are set forth in the appended claims.

Although the invention is illustrated and described herein as embodied in a method for detecting and compensating for defective printing nozzles in an inkjet printing machine using a threshold calculation based on weighting factors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a chart illustrating the definition of alpha and beta defects; and

DETAILED DESCRIPTION OF THE INVENTION

Figure 1:
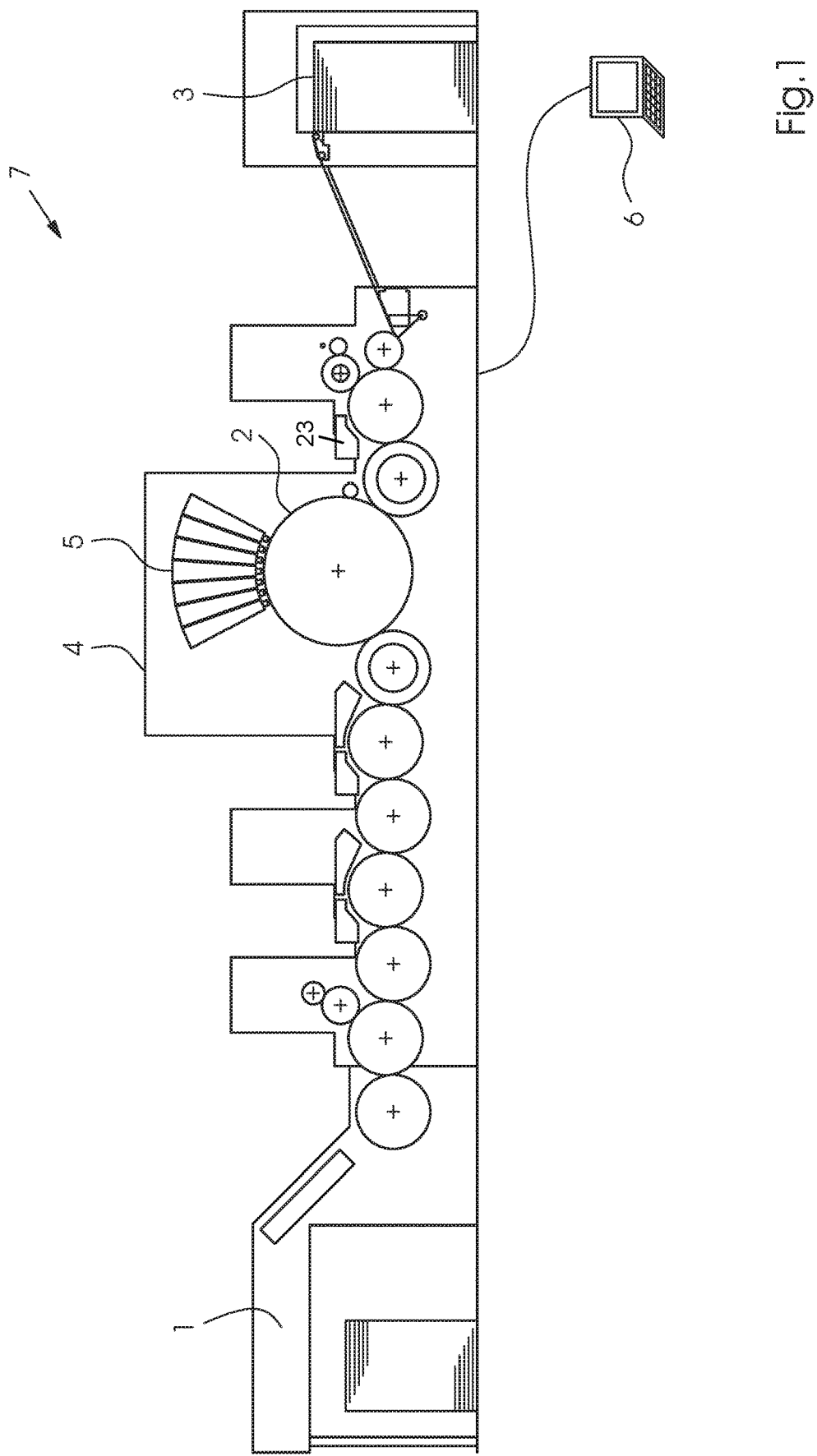
FIG. 1 is a diagrammatic, longitudinal-sectional view of an example of the structure of a sheet-fed inkjet printing machine.
Figure 2:
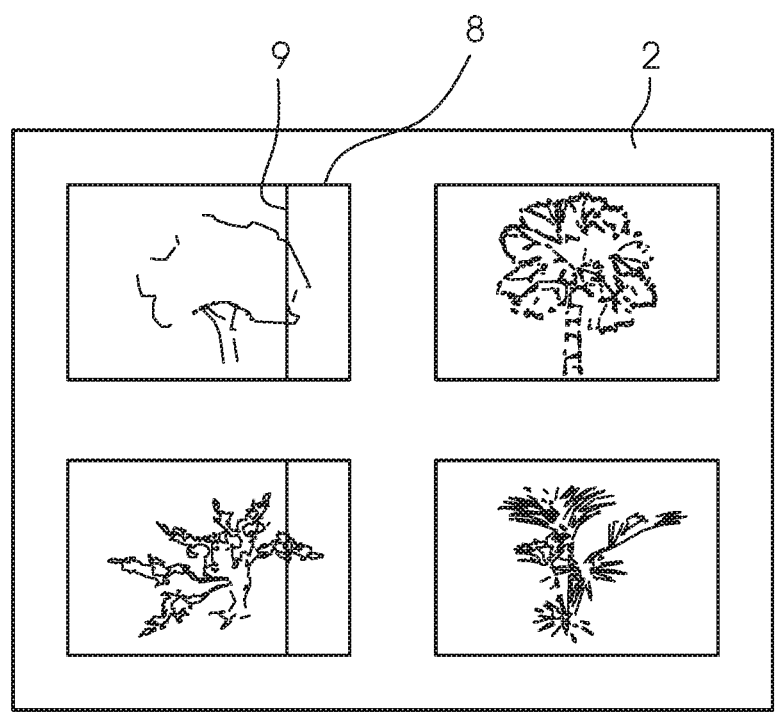
FIG. 2 is a top-plan view of a printing substrate showing an example of a white line caused by a defective nozzle.

Referring now in detail to the figures of the drawings, in which mutually corresponding elements have the same reference symbols, and first, particularly, to FIG. 1 thereof, it is seen that the field of application of the preferred exemplary embodiment is an inkjet printing machine 7. FIG. 1 shows an example of the fundamental construction of such a machine 7, including a feeder 1 for feeding a printing substrate 2 to a printing unit 4, where it receives an image printed by print heads 5, a delivery 3 and a sensor 23 for recording an area coverage element of a test chart. The machine is a sheet-fed inkjet printing machine 7 controlled by a control unit 6. While this printing machine 7 is in operation, individual printing nozzles in the print heads 5 in the printing unit 4 may fail as described above. Such a failure results in white lines 9 or, in the case of multicolor printing, in distorted color values. An example of such a white line 9 in a printed image 8 is shown in FIG. 2.

Figure 3:
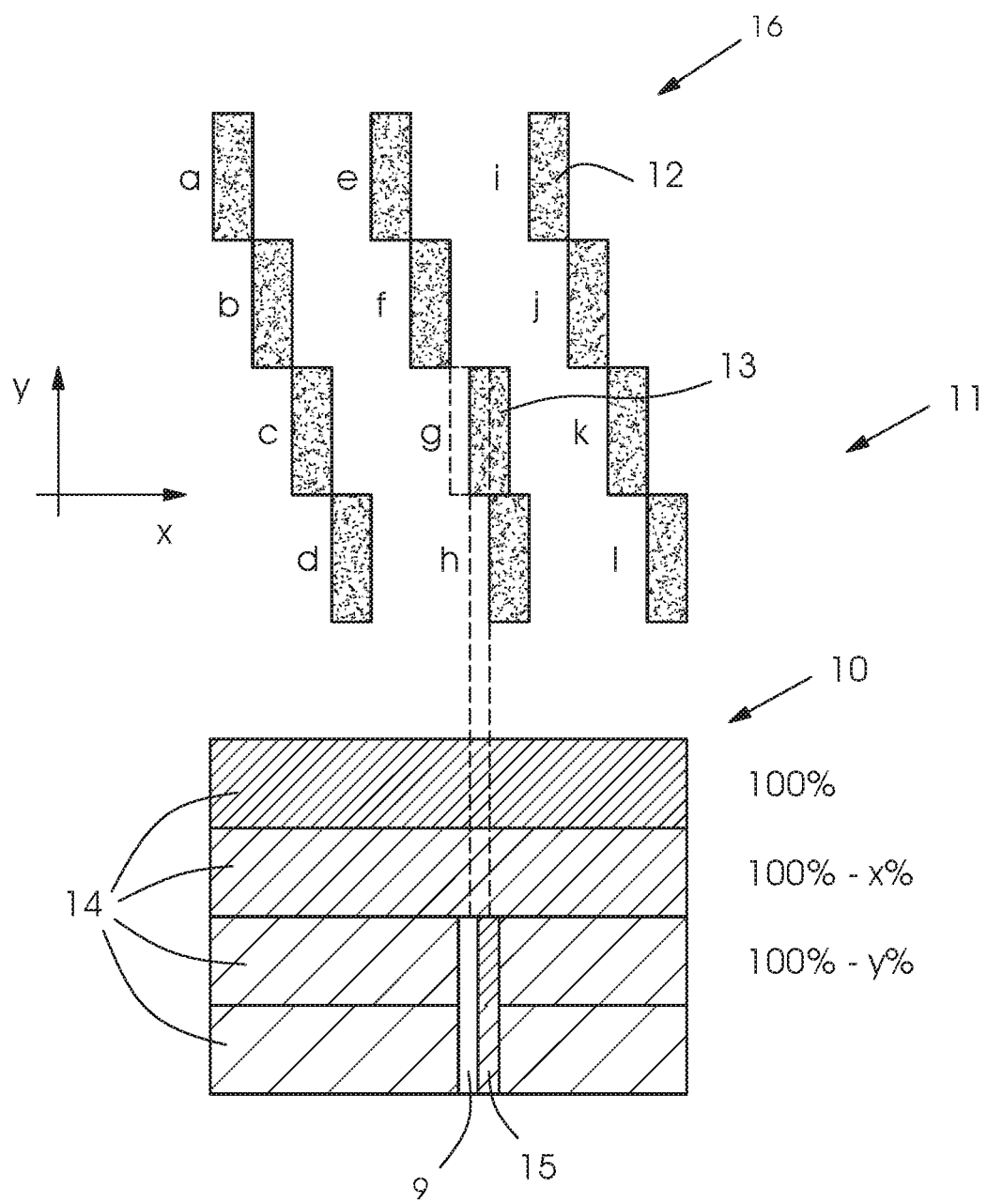
FIG. 3 is a top-plan view of an example of a printing nozzle test chart with an associated area coverage element.
Figure 5:
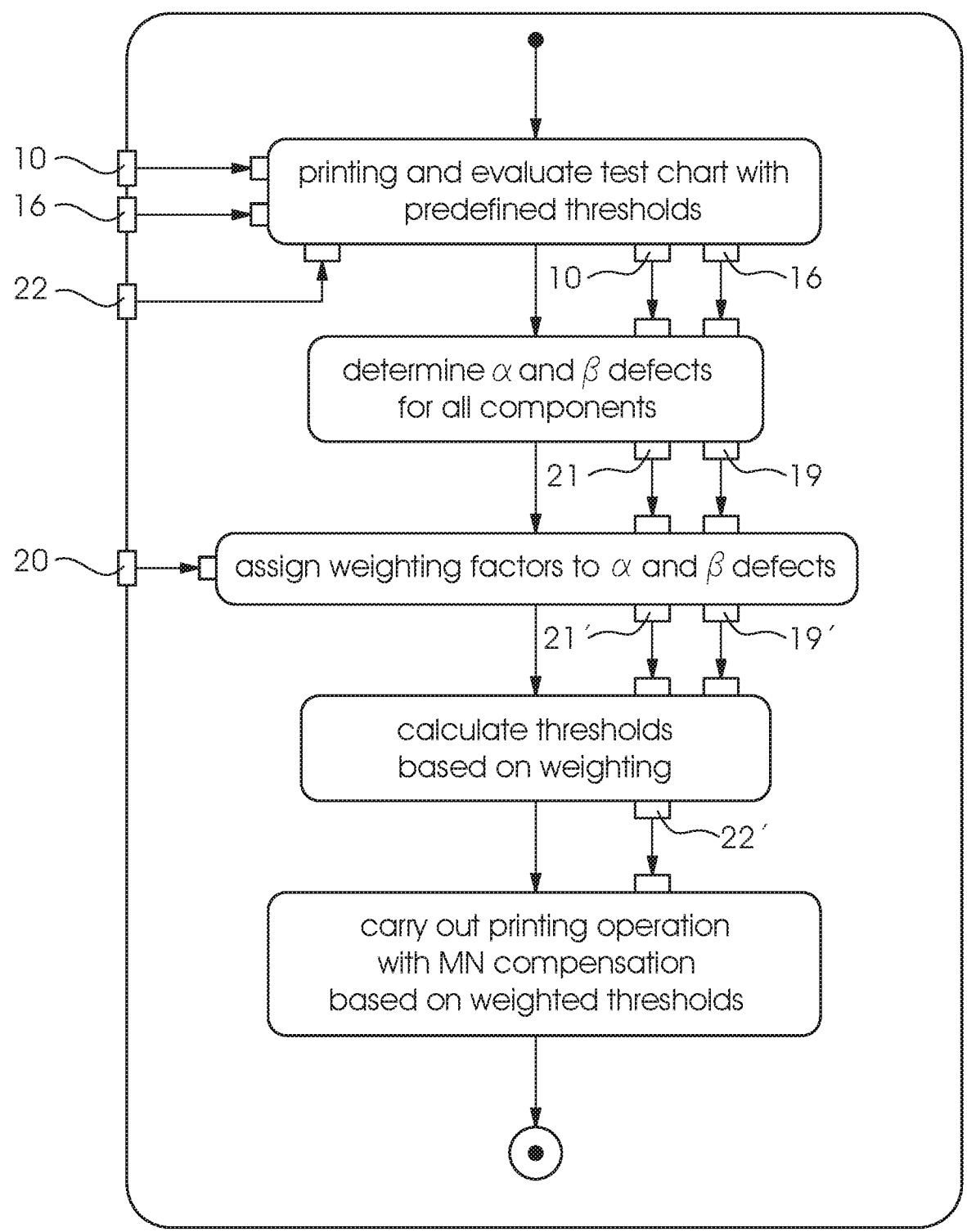
FIG. 5 is a flow chart of the steps of the method of the invention.

FIG. 5 is a flow chart of a preferred embodiment of the method of the invention. The first step is to print a combined printing nozzle test chart 11 with a respective area coverage element 10 including multiple area coverage densities in the form of different gray value wedges 14 and a printing nozzle test chart 16. Both the test chart 16 and the element 10 are shown by way of example in FIG. 3. As is clearly shown, the printing nozzle test chart 16 and the area coverage element 10 are disposed above one another. The X direction indicates the substrate width and the Y direction marks the printing direction. The upper part of FIG. 3 illustrates the printing nozzle test chart 16. In the illustrated example, the printing nozzle test chart 16 is formed of four horizontal equidistant rows 12 printed vertically. In this case, four rows mean that every fourth printing nozzle contributes to printing the vertical lines in every row. This is clearly shown in FIG. 3 by labeling the individual vertical lines a, e, and i. Accordingly, the second row includes printing nozzle lines b, f, and j. This pattern continues in rows 3 and 4 in a corresponding way. The area coverage element 10 is disposed immediately below at the same horizontal width as the printing nozzle test chart 16. It is formed of multiple strips of respective different gray value wedges 14. The strips are printed underneath one another in the printing direction. FIG. 3 shows four different gray value wedges 14, starting at 100% area coverage and reducing the area coverage down to 100-X, Y, or Z. Corresponding to an order of a decreasing area coverage, this means that X<Y<Z. Any desired number of gray value wedges may be used.

The next step is to examine the element 10 of the test chart 16 for potential print defects caused by defective printing nozzles. In this process, the area coverage element 10 is used to identify white lines 9 and the printing nozzle test chart 16 is used to determine the current state of the printing nozzles that are used. This is done on the basis of the characteristic values such as the phase (jetting angle of the printing nozzle) and "weakness," i.e. the jetted amount of ink, also referred to as amplitude. The area coverage element 10 is the first to be evaluated. This may be done by checking whether the known gray values of the area coverage element 10 are consistently present in the print. What is done is basically a comparison between the current state of the area coverage element 10 and a known good image 17 of the area coverage element 10, i.e. a reference image 17 (see FIG. 4). If a white line 9 is found in this process as shown in the area coverage element 10 in FIG. 3, it is considered a "subjectively" detected white line 9. Then the printing nozzle test chart 16 is evaluated in terms of the aforementioned characteristic values of the printing nozzles. Thus the manifestations of the characteristic values of the jetting angle value (phase) in the form of the average lateral deviation from the target position (in μm) and of the "weakness" (amplitude) in the form of the continuity and short-term stability of the printed line of the printing nozzle are determined. These actual measured values 18 are then evaluated in a corresponding way. The amplitude may be determined in a value range between 0=line not present and 1=perfect/continuous line for every individual printing nozzle. In the example shown in FIG. 3, the vertical line 13 of the nozzle line g, which is located at the center of the third row, is offset slightly to the right-hand side. Thus nozzle having the line g is a defective printing nozzle with a deviating phase, causing a white line 9 that is visible in the area coverage element 10 and a dark line 15 due to the fact that the nozzle prints in the region of the nozzle line h.

The subjective print defects 9, 15 that have been identified in the area coverage element 10 and the characteristic values that have been determined in the printing nozzle test chart 16 for all printing nozzles and assigned to these print defects are entered into a table. The table shows the manifestations of the characteristic values of phase and amplitude for the white line 9 that has been subjectively identified by way of example with an image of this white line 9. Thus an overview of all print defects that have subjectively been determined and the associated characteristic values may be created.

The entire table may then be used to determine optimum thresholds 22' for the characteristic values. For this purpose, so-called alpha and beta defects 19, 21 need to be determined. FIG. 4 gives an overview of the definitions of these parameters. If, for instance, a white line 9 is subjectively discovered in the course of the evaluation of the area coverage element 10 and the associated printing nozzle has corresponding characteristic values that are above the applied thresholds 22 in terms of amplitude and phase, the detection was a success. A problem occurs if there are no corresponding characteristic values that exceed the thresholds 22 to go with the white line 9 that has been subjectively detected. This is a so-called beta defect 19: a print defect was found but the printing nozzle that is (probably) responsible does not have deviating characteristic values and will therefore not be detected in the detection process that will be carried out later during the production run and preferably only uses the printing nozzle test charts 16. Consequently, beta defects 19 will not be compensated for, resulting in an uncompensated white line 9.

The reverse case is an alpha defect 21: the evaluation of the printing nozzle test chart 16 finds characteristic values that exceed the thresholds 22 but these characteristic values cannot be associated with a visible white line 9 in the area coverage element 10. In the detection process carried out later during the production run, such an alpha defect will cause the printing nozzle in question to be deactivated and compensated for. Since the compensation of a printing nozzle, for instance by using the neighboring printing nozzles, has a negative effect on the quality of the print, such an alpha defect 21 is vexatious. The result of such an alpha defect 21 is that a printing nozzle that is in fact working properly is switched off and compensated for.

Therefore, the method of the invention aims at calculating the thresholds 22 for all characteristic values that have been determined in such a way that the number or the proportion of the total of alpha defect 21 plus beta defect 19 is minimized. This is done by a calculation formula that may have the following simplified fundamental pattern:

Alpha defect 21+beta defect 19=minimal

An additional expedient aspect is to provide alpha defects 21 and beta defects 19 with different weightings. In most cases, an uncompensated white line 9 will be considered a greater problem than switching off and compensating for a printing nozzle that does work after all. For this purpose, alpha defects 21 and beta defects 19 are given the corresponding weighting factors a, b 20 in the calculation formula:

$a*$alpha defect$+b*$beta defect=minimal

The weighting factors 20 may be adapted to the requirements in any desired way by the operator. Depending on how much importance is attributed to alpha and beta defects 21, 19 in the current print job, they may be influenced by the weighting factors 20 to influence the applied detection and compensation method, which is what determines the resultant quality of the print.

Since the thresholds need to be calculated for several characteristic values such as amplitude and phase, the result is a multidimensional system of equations based on the following:

a*alpha defect 21+b*beta defect 19=minimum=f(phase, amplitude, homogeneity, density/Lab, manifestation of features of ink, manifestation of features of substrate 2, . . . )

This set of equations may then be solved to calculate the optimum, i.e. weighted, thresholds 22' in various approaches. These may include logistic regression, discriminant analysis, Bayes classifiers, perceptron, or neuronal networks.

The last step is to apply the calculated weighted thresholds 22' to the actual inkjet printing operation. These thresholds 22' allow the detection and compensation for the detected white lines 9 to be influenced by the operator for the subsequent production run in terms of the subjective evaluation of the print detects that have occurred.

Thus the method of the invention describes the process and strategy of determining weighted optimum thresholds 22' that imitate a human assessment in the best possible way. These thresholds 22' may be used for a statistical prediction model that for every printing nozzle predicts the likelihood of exceeding a print quality tolerance on the basis of previous measurement values. Using thresholds 22' that imitate a human assessment of the printed products in an optimum way minimizes both the producer's risk (i.e. when a characteristic value exceeds a threshold/tolerance 22 although a human observer does not recognize any defect in the quality of the print) and the consumer's risk (i.e. when a human observer realizes a defect in the print quality although the characteristic values do not exceed any threshold) down to the smallest risk of an error in judgment. This may be done in a weighted way, too. For instance, if the consumer's risk is ten times more important than the producer's risk, the weighted total risk may be minimized in a corresponding way.

Compared to the prior art, the method of the invention has considerable advantages in terms of accurately detecting defective printing nozzles with a view to activating and deactivating printing nozzles in the context of the applied compensation method.

The following is a summary list of reference numerals and the corresponding structure used in the above description of the invention:

1 feeder
2 current printing substrate/current print sheet
3 delivery
4 inkjet printing unit
5 ink jet print head
6 computer
7 inkjet printing machine
8 image on the current print sheet
9 white line
10 area coverage element
11 combined printing nozzle test chart
12 equidistant vertical line
13 equidistant vertical line deviating due to a missing nozzle
14 various gray value wedges
15 dark line
16 printing nozzle test chart with equidistant vertical lines
17 good image/reference
18 actual measurement result
19 beta defect
19' weighted beta defect
20 weighting factors
21 alpha defect
21' weighted alpha defect
22 predefined thresholds
22' weighted thresholds
23 sensor

The invention claimed is:

1. A method for detecting and compensating for defective printing nozzles in an inkjet printing machine with a computer, the method comprising the following steps:
periodically printing at least one multi-row printing nozzle test chart formed of a specified number of horizontal rows of equidistant vertical lines disposed underneath one another for detection and including only printing nozzles of a print head of the inkjet printing machine contributing to the printing nozzle test chart in every row corresponding to the specified number of horizontal rows and printing at least one area coverage element geometrically associated with the at least one multi-row printing nozzle test chart;
using at least one image sensor to record and using the computer to evaluate the at least one area coverage element and the printing nozzle test chart;
using the computer to identify print defects by evaluating the recorded area coverage element and to allocate the print defects to defective printing nozzles;
using the computer to evaluate the multi-row printing nozzle test chart based on thresholds to detect defective printing nozzles; and using the computer to carry out a comparison of the detected defective printing nozzles from the recorded area coverage element and from the printing nozzle test chart to identify detected defective printing nozzles causing defects in only one of the at least one area coverage element or the printing nozzle test chart and to calculate the thresholds to minimize an amount of the detected defective printing nozzles based on data from the comparison to compensate for the detected defective printing nozzles.

2. The method according to claim 1, which further comprises:
designating defective printing nozzles that were detected in the recorded area coverage element but not in the printing nozzle test chart as corresponding to a beta defect and designating defective printing nozzles that were detected in the recorded printing nozzle test chart but not in the area coverage element as corresponding to an alpha defect; and
using the computer to assign factors to the alpha and beta defects to provide a weighting of the alpha and beta defects and consequently a weighted calculation of the thresholds based on weighted alpha and beta defects.

3. The method according to claim 2, which further comprises carrying out the weighted calculation of the thresholds by applying a mathematical function including the alpha and beta defects with their respective factors and minimizing total values.

4. The method according to claim 3, which further comprises using each one of the thresholds to refer to a specific characteristic value of the inkjet printing operation including a deviation of a print dot of a printing nozzle, a jetted amount of ink, a homogeneity of a resultant color density, or a manifestation of ink features or of substrate features, and using the computer to determine the characteristic values based on the evaluation of the recorded printing nozzle test chart.

5. The method according to claim 4, wherein the mathematical function depends on the characteristic values of the inkjet printing operation.

6. The method according to claim 3, which further comprises implementing a solution to the mathematical function for calculating the thresholds by applying a logistic regression, a discriminant analysis, a Bayes classifier, a perceptron, or a neuronal network.

7. The method according to claim 1, which further comprises:
carrying out the method to set up the inkjet printing machine;
only printing the printing nozzle test chart at regular intervals during a production run to be evaluated by using the calculated thresholds; and
deactivating and compensating for detected defective printing nozzles by using suitable compensation processes.

8. The method according to claim 7, which further comprises:
carrying out a compensation by printing nozzles adjacent the detected defective printing nozzle as the suitable compensation processes; and
attaining the compensation by increasing an amount of ink jetted by the adjacent printing nozzles once a printed image has been screened or by adapting gray values prior to a screening of a print.

* * * * *